Nov. 23, 1954  D. I. REBIKOFF  2,694,956
PHOTOELECTRIC COLORIMETER
Filed Aug. 29, 1950  2 Sheets-Sheet 1
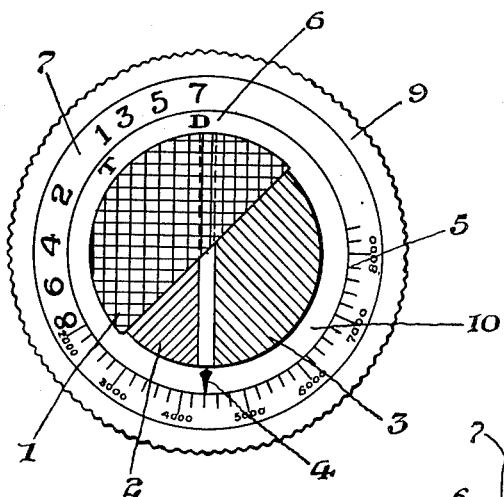
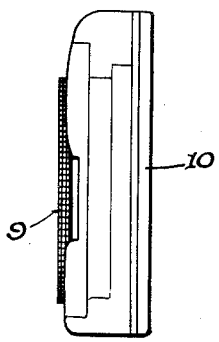
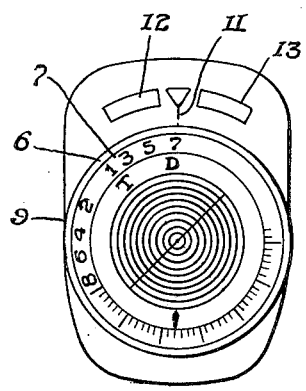
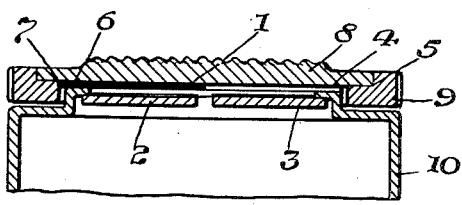
Inventor
Dimitri Issaiewitch Rebikoff
by his Attorneys,
Darby & Darby Nov. 23, 1954  D. I. REBIKOFF  2,694,956
PHOTOELECTRIC COLORIMETER
Filed Aug. 29, 1950  2 Sheets-Sheet 2

Inventor,
Dimitri Issaiewitch Rebikoff
by his Attorneys,
Darby & Darby

United States Patent Office 2,694,956
Patented Nov. 23, 1954

2,694,956

PHOTOELECTRIC COLORIMETER

Dimitri Issaiewitch Rebikoff, Lausanne, Switzerland

Application August 29, 1950, Serial No. 181,976

1 Claim. (Cl. 88—22.5)

This invention relates to a photoelectric measuring device and in particular to a device useful for measuring the composition of light to determine the relative intensity of color components thereof, thereby to evaluate the composition of the light to make it possible to expose color sensitive film appropriately in the light measured.

The process of comparing electric currents developed by a pair of photocells situated behind red and blue filters to ascertain the relative portion of red and blue light in luminous radiation, which has an intensity sufficient to act upon the cells, is known and is used for the purpose of determining the temperature of the color of the luminous radiation source, which is characteristic of the spectral composition of all luminous radiations coming from incandescent black bodies (Planck's law).

It is accordingly a fundamental object of the instant invention to provide a simple and practical means in the form of a photoelectric colorimeter for measuring the intensity and composition of light so that an appropriate exposure for color film may be made based on the measurement.

It is a further object of the instant invention to provide a convenient instrument for measuring the composition of light and temperature of radiation in a manner useful for color photography.

Other objects and advantages of the invention will in part be obvious and in part appear hereinafter.

The invention accordingly comprises a photoelectric colorimeter formed as a unitary instrument, including comparator cells, color filters and a galvanometer circuit for comparing the relative intensity of color components of lights being measured by the cells and a scale for indicating the measurement. The invention accordingly is embodied in a photoelectric colorimeter having the features of construction, combinations of elements and arrangement of parts hereinafter to be described.

Referring to the drawing, Figure 1 constitutes a plan elevation of the body of the device;

Figure 2 is a side elevation thereof;

Figure 3 is an enlarged plan view of the cell body and measuring scales;

Figure 4 is a section taken through Figure 3;

Figure 4a is an enlarged section of a portion of the mask structure;

In Figures 1 and 2, the general external appearance of the device is shown to consist of a body portion 10, which is preferably made of transparent material, carrying an indication needle 11 which extends over the face of the scale area 12—13.

Figure 5:
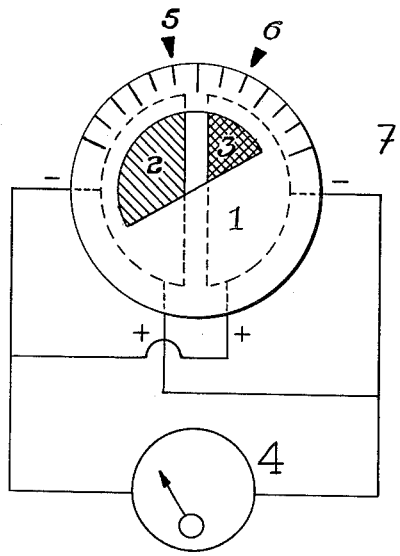
Figure 5 is a diagrammatic representation of the circuit indicating the body in plan view.
Figure 6:
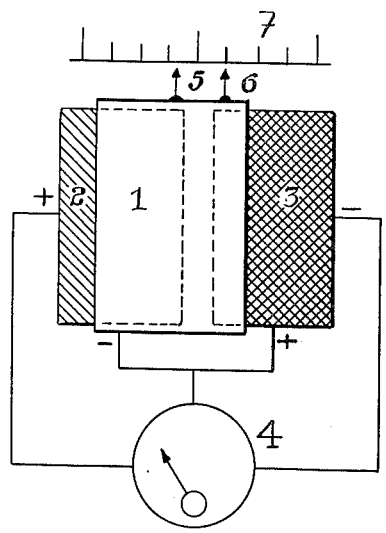
Figure 6 is a diagrammatic representation of the circuit.

Referring to Figure 3, it will be seen that the instant invention renders measurement simple and practicable by furnishing a revolving hollow mask 1, which serves simultaneously as a dial for direct reading of the variables sought, namely temperature of the color or the number of the compensating filter to be used in case it is being used for photographing in color. Behind the revolving mask 1 a pair of photoelectric cells forming a light intercepting stratum are placed side by side, one being behind a filter which permits the long waves (e. g. red) of the spectrum to pass and the other behind a filter which allows the shorter waves (e. g. blue) to pass while intercepting other radiations. These two cells may be set in opposition in a galvanometer circuit which has a moving element (as shown in Figure 5); or they may be used to form part of a bridge circuit; or they may be connected to the poles of the galvanometer with a double moving unit (as shown in Figure 6).

In these several alternatives the galvanometer serves simply as an indicator of a zero condition and shows the equilibrium between the electromotive forces obtained from the two photoelectric cells. According to the quality of the light to be measured, in this specific instance, its content of red and blue, equilibrium is established by a greater or lesser masking of the two cells by the revolvable mask 1.

In the Figures 2 and 3 are the photoelectric cells. 4 is the index to be read against the movable scale 5. Fixed points of reference 6 are related to index 4 and used in making a reading corresponding, for example, to the film most appropriate for use with artificial light (T) and with daylight (D). Scale 7 designates the temperature of the color in terms of the appropriate filter to be used in the light measured.

It should be noted that the revolvable mask may also carry the reference points, and in that case the scales would remain fixed.

In Figure 6 there is shown a variant of the mask which slides rather than turns. It may also take the form of a sector which can be oscillated about an axis eccentric to the two cells. However, it should be noted that variants in the shape of the mask make no change in the principle of the invention, which is to balance the red electromotive signal against the blue electromotive signal by masking an appropriate portion of the respective photoelectric cells. A practical embodiment of the arrangement described in detail in Swiss Patent 37,672 is as follows: 2 and 3 are the two photoelectric cells made in semi-circular form and furnished with color filters and connected in opposition to the zero indicating galvanometer. A shutter or mask 1, by rotation, permits compensating the variations of the red-blue ratio of the light being measured by bringing the galvanometer to zero.

This shutter 1 has a semi-circular form and has a layer of opaque paint applied to the rear face of the transparent element 8. The latter element may be roughened by etching or, as shown, may be formed with concentric grooves therein to obtain efficient diffusion of the transmitted light before it reaches the photoelectric cells 2 and 3. This form, illustrated in detail in Figure 4a, has the separate corrugations of circular outline and has the advantage of intercepting light efficiently from all angles.

The two photoelectric cells 2 and 3 are integral with the casing 10, and are visible under the glass 8 which carries the reference points 4 and 6 for the measurements. The glass 8 and the mask 1 which are integral with the ring 9, may turn freely on the casing 10. At 5 and 7, the ring 9 carries the measuring scales which are visible through the glass 8 and which consequently are displaced proportionally and integrally with reference to the points of reference 4 and 6 in respect of the rotations of the shutter 1 in front of the two photoelectric cells 2 and 3.

In the example shown in the drawing 5 is a scale of the temperatures of colors in degrees Kelvin. Seven (7) is a series of numbers corresponding to a series of filters, which, in a particular case, will compensate the variations of the temperature of the colors which are undesirable in color photography. In effect therefore 7 is also a temperature scale.

The reference point 4 in the scale is a simple index such as an arrow. Reference point 6 may be made up of two or more indications corresponding to different variations of color film which are available for exposure, such as the daylight "D" type or the artificial light or "T" type. All the described elements including the shutter 1, glass 8, casing 10, cells 2 and 3, scales 5 and 7, and the ring 9 in the preferred embodiment are mounted concentrically so that the readings bear direct relationships to each other. The manner of making a reading is as follows:

On the movable ring 9 surrounding the cell structure a temperature scale 5 calibrated in degrees Kelvin, for example, is so placed that the indicator 11 on the galvanometer is at its equilibrium point when the cells are pointed toward a light source of known temperature indicated on the scale. On the same movable ring 9 the filter scale 7 is placed, designated in the present embodiment by a series of digits from 1 to 8, which filter scale is also oriented with respect to an additional pair of fixed index points 6 designated in the present embodiment by T and D for, tungsten filament lamps and daylight.

In using the instrument, therefore, the photoelectric cells 2 and 3 are pointed toward the source of light so that the quality of incident light is measured. By rotating the ring 9 and therefore carrying the temperature and filter scales, 5 and 7, together with the mask 1 until the needle 11 of the galvanometer comes to its equilibrium point, the fixed index 4 on the temperature scale will give the temperature of the source of light.

Since most color film is adjusted in sensitivity toward daylight, for tungsten filament at a temperature 3200° K., the filter scales can be accurately placed for the proportion of red and blue in the incident light measured. In the instant embodiment the T of the tungsten and D of daylight are used as index points for the filter scale and the digit which appears over the T or D is the number of the appropriate filter to be used with that film for photographing a subject illuminated by light from the source measured.

An additional method of using the device in artificial light with film adjusted to light from a tungsten filament at 3200° K. is to set index 4 at 3200° K. on the scale 5 and by means of a voltage control in the light circuit adjust the temperature of the tungsten filament to that level. In such a case, no filter would be needed.

The instrument is preferably constructed with a transparent casing which will constitute essentially the body of the instrument. Specifically referring to Figures 1 and 2, the casing 10 is formed of a transparent material, such as a clear plastic of the polymethylmethacrylate type, and transmits light without material absorption. Also the cover for the instrument may be formed of like material. The galvanometer movement of the measuring instrument portion is set in the casing 10 so that the indicating needle 4 is visible from both sides of the meter. In front of the needle the inside wall of the casing and also the cover bear the indicia or figures which may be engraved, printed or embossed on the respective scales. Since light passes through the meter and is intercepted by the scale, it is possible to make a reading from either direction, depending upon how the photographer chooses to hold the instrument.

Though the invention has been described with only a single embodiment which is illustrative of the subject matter, it should be understood that variations thereof may be made without departing from the spirit or scope of the invention.

What is claimed is:

A photoelectric colorimeter comprising a unitary instrument formed of a casing, a pair of photoelectric cells of equal area formed to be substantially semicircular in section mounted in said casing to form a circular unit sensitive to radiation, one sensitive to blue radiation and the other sensitive to red radiation, a semi-circular mask balancing the relative amounts of radiation striking the cells, a galvanometer connected across the cells to determine the equilibrium point of the electromotive signals obtained therefrom, an indicator carried by said galvanometer, said casing having a transparent section thereon which can be viewed from either face of the instrument, a scale on said casing carried in fixed relation to the mask for indicating the temperature of light observed by the balancing of the electromotive signals against each other with fixed reference points on the casing carrying the cells, the indicator of said galvanometer being visible in the transparent section of said casing to indicate the attainment of a null point, the readings on the scale being proportional to the red-blue ratio of the radiation admitted to the cells by the mask, said mask being formed semicircular of an area equal to the area of one of said cells and being carried by a ring on the body of said casing mount around the said cells so that said mask is oriented over said cells, said ring being accessible at the edges of the casing for rotation thereof to adjust the position of said mask relative to said cells.

References Cited in the file of this patent

UNITED STATES PATENTS

| Number | Name | Date |
| --- | --- | --- |
| 2,166,824 | Runaldue | July 18, 1939 |
| 2,319,212 | Cooley | May 18, 1943 |
| 2,330,877 | Fleisher et al. | Oct. 5, 1943 |
| 2,382,439 | Osborn | Aug. 14, 1945 |
| 2,439,373 | Stearns | Apr. 6, 1948 |
| 2,455,116 | Gittus | Nov. 30, 1948 |
| 2,462,823 | Woodward | Feb. 22, 1949 |
| 2,579,347 | Taylor | Dec. 18, 1951 |

FOREIGN PATENTS

| Number | Country | Date |
| --- | --- | --- |
| 508,802 | Great Britain | July 5, 1939 |
| 925,985 | France | Apr. 14, 1947 |

OTHER REFERENCES

Journal of Sci. Instr.—vol. 6—December 1929—publ. Cambridge University—London—pages 374 through 379.

J. O. S. A. article by Sweet—vol. 30—November 1940—pages 568 through 571.